US008731525B2

(12) United States Patent
Liu et al.

(10) Patent No.: US 8,731,525 B2
(45) Date of Patent: May 20, 2014

(54) SINGLE BUTTON CONTACT REQUEST AND RESPONSE

(75) Inventors: Eric Liu, Santa Clara, CA (US); Francisco J. Fangonilo, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1080 days.

(21) Appl. No.: 11/832,635

(22) Filed: Aug. 1, 2007

(65) Prior Publication Data

US 2009/0036149 A1 Feb. 5, 2009

(51) Int. Cl.
*H04M 1/663* (2006.01)

(52) U.S. Cl.
USPC ......... 455/412.2; 455/415; 455/461; 455/567

(58) Field of Classification Search
CPC ....... H04W 4/12; H04W 4/14; H04M 1/2477; H04M 1/72547; H04M 3/42382
See application file for complete search history.

(56) References Cited

U.S. PATENT DOCUMENTS

| | | | | |
|---|---|---|---|---|
| 6,735,457 | B1 * | 5/2004 | Link et al. | 455/575.1 |
| 6,876,862 | B1 * | 4/2005 | Tanaka | 455/466 |
| 2004/0037399 | A1 * | 2/2004 | Manohar | 379/88.03 |
| 2005/0136901 | A1 | 6/2005 | Jung et al. | |
| 2005/0220283 | A1 | 10/2005 | Ho | |
| 2006/0068816 | A1 * | 3/2006 | Pelaez et al. | 455/466 |
| 2006/0205432 | A1 * | 9/2006 | Hawkins et al. | 455/552.1 |
| 2007/0038720 | A1 * | 2/2007 | Reding et al. | 709/217 |
| 2007/0087789 | A1 * | 4/2007 | Lee et al. | 455/566 |

FOREIGN PATENT DOCUMENTS

| | | |
|---|---|---|
| EP | 1499145 A2 | 1/2005 |
| WO | WO-2006/101148 A1 | 9/2006 |

OTHER PUBLICATIONS

PCT International Search Report and Written Opinion, PCT Application No. PCT/US2008/070795, Aug. 19, 2009, 9 pages.
Supplementary European Search Report mailed Jul. 14, 2011, in European Application No. 08782223.5.

* cited by examiner

*Primary Examiner* — Rafael Pérez-Gutiérrez
*Assistant Examiner* — Keith Fang
(74) *Attorney, Agent, or Firm* — Mahamedi Paradice Kreisman LLP

(57) ABSTRACT

A system and a method are disclosed for sharing contact information between two mobile phones. A user of a first mobile phone can select contact information stored in the mobile phone to be shared with a second mobile phone while having live phone call with a caller of the second mobile phone. The first mobile phone transmits the contact information to the second mobile phone using a voice channel of the phone call while the phone call is established. For example, the first mobile phone may convert the contact information into an audio signal and send the audio signal to the second mobile phone while the phone call is established. The second mobile phone receives the contact information and provides a user interface such that a caller can call a phone number in the contact information with a single button press.

17 Claims, 6 Drawing Sheets

SINGLE BUTTON CONTACT REQUEST AND RESPONSE

BACKGROUND

1. Field of Art

The disclosure generally relates to the field of mobile communication, in particular to sharing information between two mobile phones.

2. Description of the Related Art

Mobile phones are an important communication centerpiece for many people and their usages continue to increase. In addition, an increasing member of mobile phone users are storing contact information in their mobile phones. Frequently, a mobile phone user (the sender) desires to share his or her stored contact information with another mobile phone user (the recipient) while continuing to have a phone conversation with the recipient. To do so, the sender traditionally retrieves the contact information (e.g., a phone number) and reads it to the recipient. The recipient captures this information by using, for example, pen and paper to jot down the information, committing the phone number to memory, or physically typing the information into an electronic device such as a desktop computer. This process introduces a risk of human errors by relying on the sender and the recipient to communicate the contact information because such information may be incorrectly jotted, down, recalled, or typed. Moreover, the manned nature of this activity may be inconvenient for the recipient, such as when the recipient does not have access to these mediums, is distracted, or otherwise is unable to take in the information.

Hence, there is a lack of mechanism and process to easily share contact information between two mobile phones.

SUMMARY

Using various embodiments disclosed herein, mobile phones share contact information with other mobile phones. The embodiments include a system and method that enables a first mobile phone user (e.g., the sender) to identify contact information (e.g., a phone number) to be electronically shared with a second mobile phone user (e.g., the recipient) while maintaining a phone call with the recipient. The system and method sends the contact information from the sender's mobile phone to the recipient's mobile phone and provides the recipient with a user interface to capture the contact information. In one embodiment, the recipient can choose to make a phone call using the received contact information or store the contact information in the recipient's mobile phone for later retrieval.

In one embodiment, the sender initiates a phone call with the recipient, selects a phone number in the sender's mobile phone, and transmits the phone number to the recipient's mobile phone while maintaining the phone call. The recipient's mobile phone receives the phone number while the phone call is alive and provides a user interface to the recipient to call the received phone number with a single button press.

In one embodiment, the system and method provides the sender with an user interface for the sender to look up contact information to be shared during an established phone call. The system and method may use the voice channel of the phone call to transmit the contact information between the mobile phones. The contact information may be transferred using audio signals. The system and method may use protocols such as the Dual Tone Multiple Frequencies (DTMF) tones to communicate the contact information. Alternatively, the system and method may allow the sender to read the contact information and enable the recipient's mobile phone to recognize the contact information using voice recognition technology.

In another embodiment, the system and method utilizes services such as the Short Message Service (SMS) and an email service to transmit the contact information between mobile phones. The system and method may transmit the contact information while the phone call is alive, or terminate the phone call before transmitting the contact information. The sender's mobile phone may use special codes to label the messages containing the contact information as special messages. The recipient's mobile phone may identify and extract the contact information using the special codes.

One advantage of the disclosed configuration is that it is not necessary for users to establish a separate communication channel. The contact information may be transmitted using the voice channel of the phone call. Another advantage is that the contact information may be transferred while maintaining a phone call. Therefore, a recipient may receive the information immediately during the phone call. Yet another advantage is that the recipient may easily make a phone call with a single button press after receiving the contact information.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying drawings. The drawings are as follows:

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Mobile Computing Device

Figure 1:
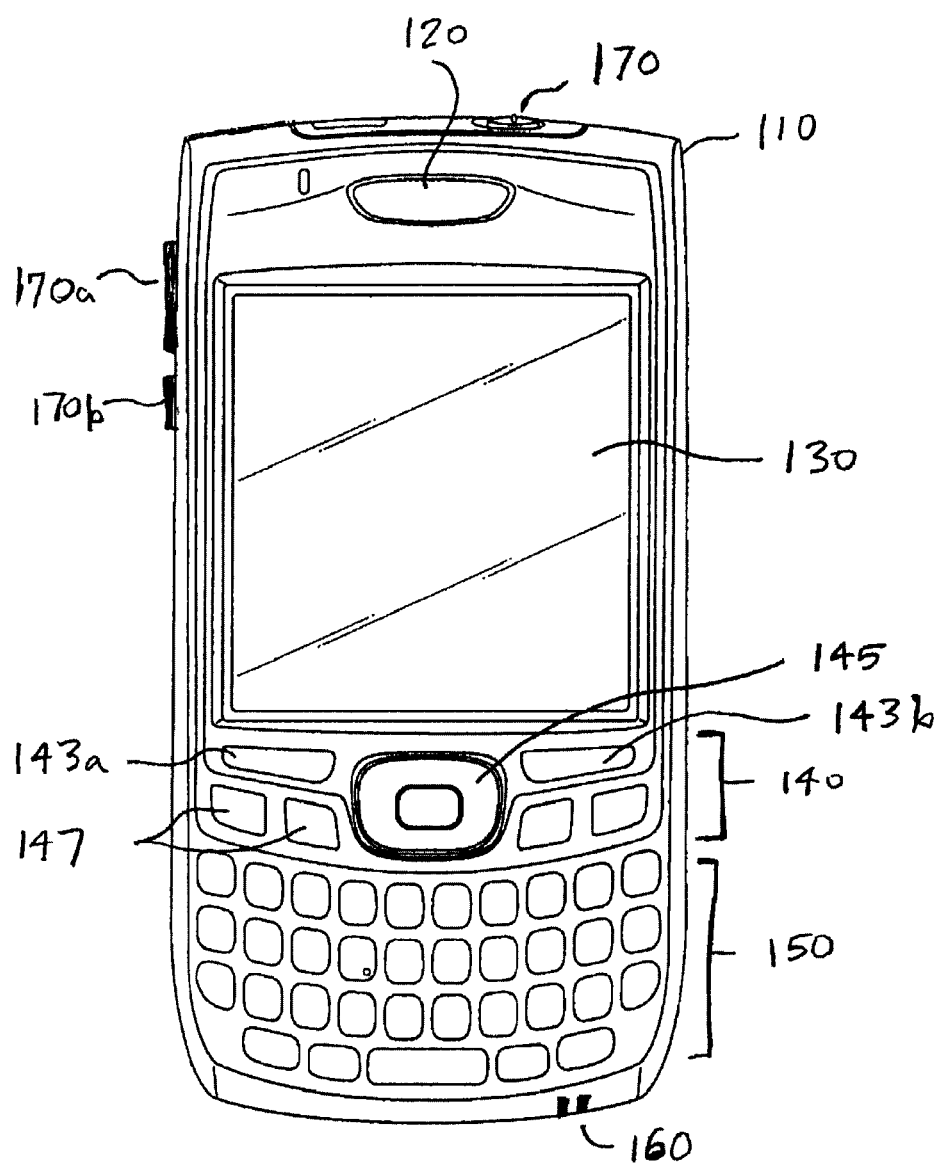
FIG. 1 illustrates one embodiment of a mobile computing device.

FIG. 1 illustrates one embodiment of a mobile computing device 110 with telephonic functionality, e.g., a mobile phone or a smartphone. The mobile computing device is configured to host and execute a phone application for placing and receiving telephone calls. It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN). Moreover, the principles disclosed herein may also be applied to other devices, such as personal digital assistants (PDAs), media players and other similar devices.

The mobile computing device 110 is configured to be of a form factor that is convenient to hold in a user's hand, for example, a personal digital assistant (PDA) or a smart phone form factor. For example, in one embodiment the mobile computing device 110 can have dimensions ranging from 7.5 to 15.5 centimeters in length, 5 to 12.75 centimeters in width, 0.5 to 2.5 centimeters in height and weigh between 50 and 250 grams.

The mobile computing device 110 includes a speaker 120, a screen 130, a navigation area 140, a keypad area 150, and a microphone 160. The mobile computing device 110 also may include one or more switches 170, 170a, 170b (generally 170). The one or more switches 170 may be buttons, sliders, or rocker switches and can be mechanical or solid state (e.g., touch sensitive solid state switch).

The screen 130 of the mobile computing device 110 is, for example, a 240×240, a 320×320, or a 320×480 transflective display. For example, the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitative), acoustically sensitive (SAW or surface acoustic wave), photo-sensitive (infrared)) including a digitizer for receiving input data, commands or information from a user. The user may use a stylus, a finger or another suitable input device for data entry, such as selecting from a menu or entering text data.

The navigation area 140 is configured to control functions of an application executing in the mobile computing device 110 and visible through the screen 130. For example, the navigation area includes an x-way (x is e.g., 5) navigation ring (or joystick) 145 that provides cursor control, selection, and similar functionality. In addition, the navigation area 140 may include selection buttons 143a, 143b to select functions viewed just above the buttons on the screen 130. In addition, the navigation area 140 also may include dedicated function buttons 147 for functions such as, for example, a calendar, a web browser, an e-mail client or a home screen. In this example, the navigation ring 145 may be implemented through mechanical, solid state switches, dials, or a combination thereof. The keypad area 150 may be a numeric keypad (e.g., a dial pad) or a numeric keypad integrated with an alpha or alphanumeric keypad (e.g., a keyboard with consecutive keys of QWERTY, AZERTY, or other equivalent set of keys on a keyboard or a Dvorak keyboard).

Although not illustrated, it is noted that the mobile computing device 110 also may include an expansion slot 125. The expansion slot 125 is configured to receive and support expansion cards (or media cards), which may include memory cards such as CompactFlash™ cards, SD cards, XD cards, Memory Sticks™, MultiMediaCard™, SDIO, and the like.

Example Mobile Computing Device Architectural Overview

Figure 2:
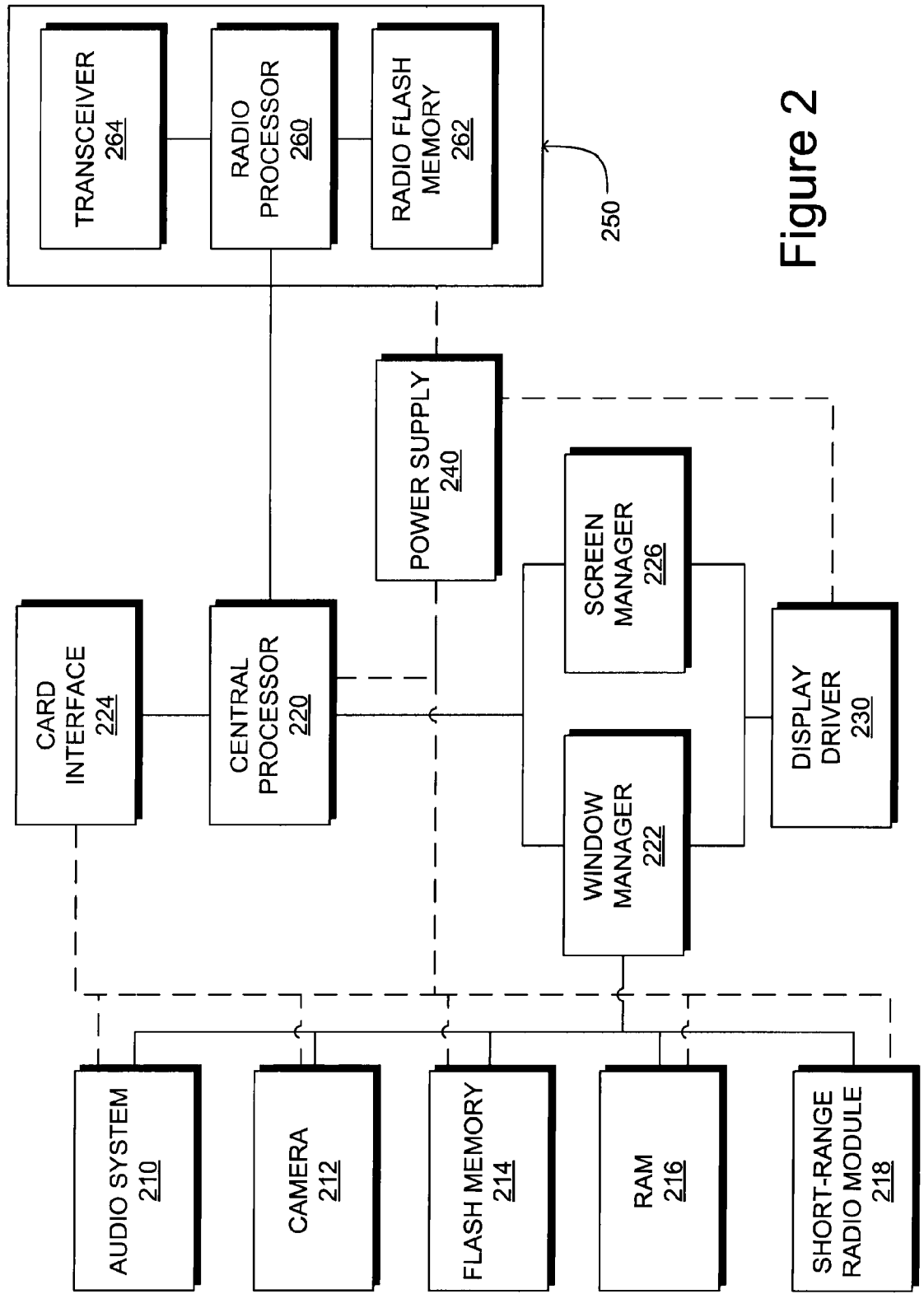
FIG. 2 illustrates one embodiment of an architecture of a mobile computing device.

Referring next to FIG. 2, a block diagram illustrates one embodiment of an architecture of a mobile computing device 110 with telephonic functionality. By way of example, the architecture illustrated in FIG. 2 will be described with respect to the mobile computing device of FIG. 1. The mobile computing device 110 includes a central processor 220, a power supply 240, and a radio subsystem 250. The central processor 220 communicates with: audio system 210, camera 212, flash memory 214, random-access memory (RAM) 216, short range radio module 218 (e.g., Bluetooth, Wireless Fidelity (WiFi) component), a window manager 222 and a screen manager 226. The power supply 240 powers the central processor 220, the radio subsystem 250 and a display driver 230 (which may be contact- or inductive-sensitive). The power supply 240 may correspond to a battery pack (e.g., rechargeable) or a powerline connection or component.

In one embodiment, the window manager 222 comprises a software or firmware instructions for processes that initialize a virtual display space stored in the RAM 216 and/or the flash memory 214. The virtual display space includes one or more applications currently being executed by a user and the current status of the executed applications. The window manager 222 receives requests, from user input or from software or firmware processes, to show a window and determines the initial position of the requested window. Additionally, the window manager 222 receives commands or instructions to display and modify a window, for example resizing the window, moving the window, or any other command altering the appearance or position of the window, and modifies the window accordingly.

The screen manager 226 comprises a software or firmware instructions for processes that manage content displayed on the screen 130. In one embodiment, the screen manager 226 monitors and controls the physical location of data displayed on the screen 130 and which data is displayed on the screen 130. The screen manager 260 alters or updates the location of data on the screen 130 responsive to input from the central processor 220, to modify the screen 130 appearance. In one embodiment, the screen manager 226 also monitors and controls screen brightness and transmits control signals to the central processor 220 to modify screen brightness and power usage to the screen 130.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120. The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, multiple Access (CDMA system), and a Universal Mobile Telecommunications System (UMTS). Examples of data networks include General Packet Radio Service (GPRS), third-generation (3G) mobile, High Speed Download Packet Access (HSDPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using a serial line 278.

The card interface 224 is adapted to communicate with the expansion slot 125. The card interface 224 transmits data and/or instructions between the central processor 220 and an expansion card or media card included in the expansion slot 125. The card interface 224 also transmits control signals from the central processor 220 to the expansion slot 125 to configure an expansion card or media card included in the expansion slot 125.

In one embodiment, central processor 220 executes logic (by way of programming, code, instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

System Operation

Figure 3:
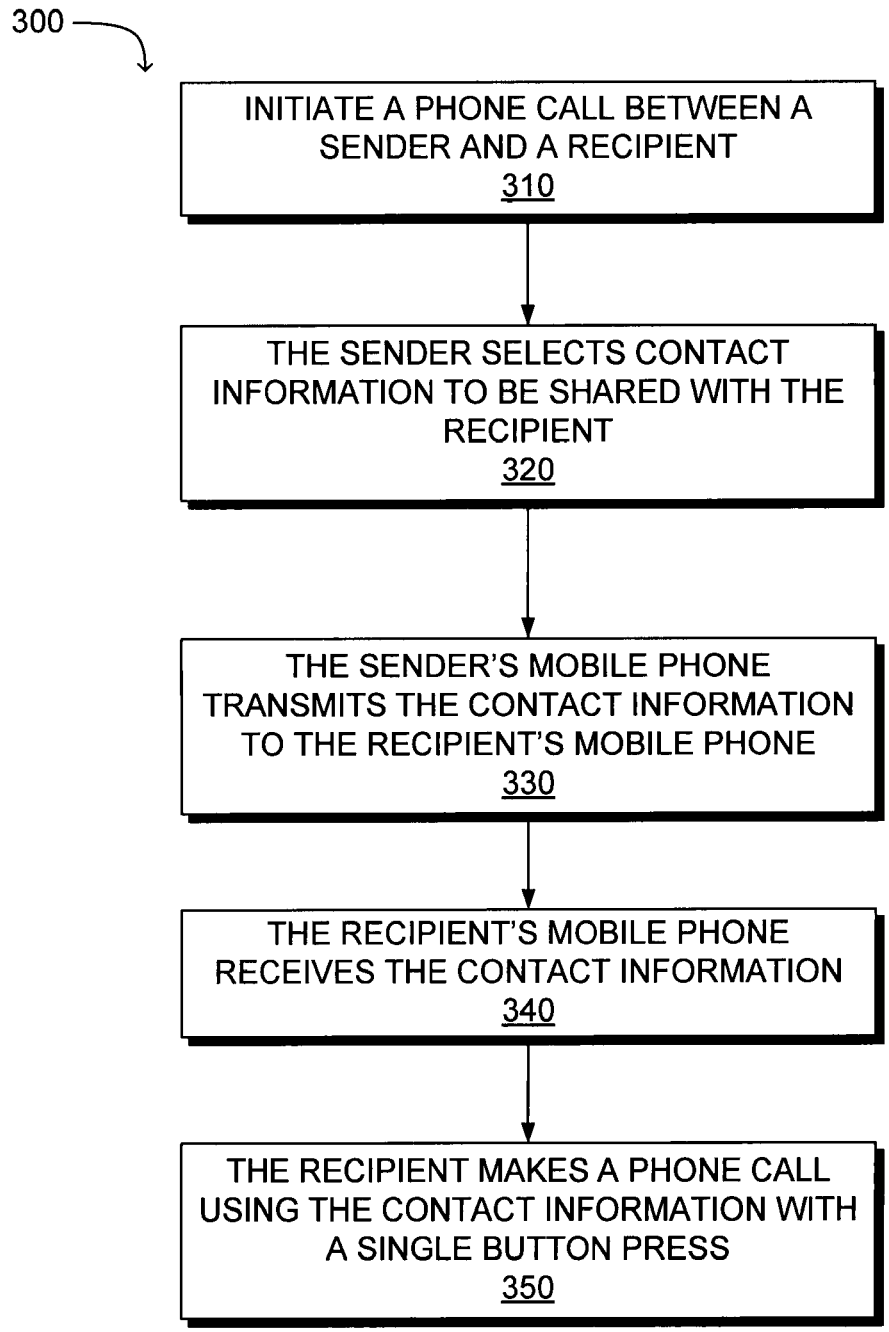
FIG. 3 illustrates one embodiment of a method for sharing contact information between two mobile computing devices.

FIG. 3 illustrates a flow chart of one embodiment of a method 300 for sharing contact information between two mobile phones. In one embodiment, one or both of the mobile phones may be mobile computing devices, e.g., the mobile computing device 110. One or more portions of the method 300 may be implemented in embodiments of hardware and/or software or combinations thereof. For example, the method 300 may be embodied through instructions for performing the actions described herein and such instrumentations can be stored within a tangible computer readable medium, e.g., the flash memory 214 or the RAM 216, and are executable by a processor, e.g., the central processor 220. Furthermore, those of skill in the art will recognize that other embodiments can perform the steps of the method 300 in different order. Moreover, other embodiments can include different and/or additional steps than the ones described here.

Initially, a mobile phone user (the sender or the recipient) initiates 310 a phone call (a telephone connection over a voice (or audio) channel) with another mobile phone user. During the phone call, the sender decides to share with the recipient a third person's contact information stored in the sender's mobile phone (e.g., responding to the recipient's request). The contact information may contain the third person's name, phone number, and other information (e.g., email address).

The sender selects 320 the third person's contact information stored in the sender's mobile phone to be shared with the recipient. In one embodiment, the mobile phone provides the sender with a user interface such as a "send number" button to share contact information during live phone conversations. The "send number" button may be a software button displayed on a screen, a hardware button, or one or more keys on a keypad. Responsive to the sender triggering (or activating, selecting) the button (e.g., by pressing the software button on a touch-sensitive display), the sender's mobile phone displays a dialog box that enables the sender to look up and/or select contact information stored in the mobile phone. In some embodiments, the dialog box may also enable the sender to look up remotely stored contacts, such as those stored in a contact management system accessible via a wired or wireless network connection. The dialog box may also enable the sender to enter contact information using input means such as the keypad 150.

The sender's mobile phone transmits 330 the selected (or inputted) contact information to the recipient's mobile phone while maintaining the phone call. In one embodiment, the selected contact information is transmitted 330 through a voice channel of the phone call. For example, the sender's mobile phone may convert the selected contact information to audio signals using protocols such as the Dual Tone Multiple Frequencies (DTMF) and transmit 330 the audio signal together with other audio signals (e.g., the sender's voice) to the recipient's mobile phone through the voice channel of the phone call. In one embodiment, the sender's mobile phone uses signals outside the audible range of hearing to transmit 330 the contact information during the phone call. In other embodiments, as further described below, the sender's mobile phone may transmit 330 the contact information through separate channels.

The recipient's mobile phone receives 340 the transmitted contact information. In one embodiment, a software or firmware process on the recipient's mobile phone receives 340 the contact information. For example, the process may detect the audio signals used to transmit the contact information and convert the signal back to the contact information. In one embodiment, the recipient may activate and/or deactivate the process. For example, the recipient's mobile phone may provide a "receive number" button similar to the "send number" button. The recipient may trigger the "receive number" button when expecting to receive contact information from the sender. Responsive to the trigger, the recipient's mobile phone activates the process. Alternatively, the process may be triggered and/or activated by incoming signals from the sender's mobile phone, such as the dialing tone of the number sign '#' in DTMF.

In another embodiment, the sender may read the contact information over the phone during the phone call, and the recipient's mobile phone may capture the contact information and parse it to extract the relevant information. For example, the recipient's mobile phone may be equipped with speech recognition technology (e.g., software) that analyzes the sender's spoken voice.

The recipient makes a phone call 350 using a contact number in the received contact information with a single button press. In one embodiment, the recipient's mobile phone may pop up a message notifying the recipient that the contact information is received and allowing the recipient to dial the contact number with just one button press. The notification message may also enable the recipient to store the received contact information in the mobile phone. If the recipient is still in conversation with the sender, the message may also enable the recipient to call the contact number and host a three-party conference.

In other embodiments, rather than transmitting the contact information through a voice channel of the phone call, the transmission may take place over a separate channel. For example, the selected contact information can be transmitted 330 as a text message using the Short Message Service (SMS) or as an email message. The message (SMS message or email message) may include a special code (or tag) for the recipient's mobile phone to recognize (or verify) that the message contains contact information, and/or to extract the contact information. Depending on the capacity of the mobile phones, it may be desirable to terminate the phone call before transmitting 330 the contact information. The message may also be queued for subsequent transmission. For example, rather than sending the message to the recipient's mobile phone immediately after the sender's selection, the sender's mobile phone may queue the message for submission after the phone call terminates.

It is noted that contact information shared between the sender and the recipient may contain contact information for several persons, and the contact information may contain information other than phone numbers.

Example Processes

Figure 4A:
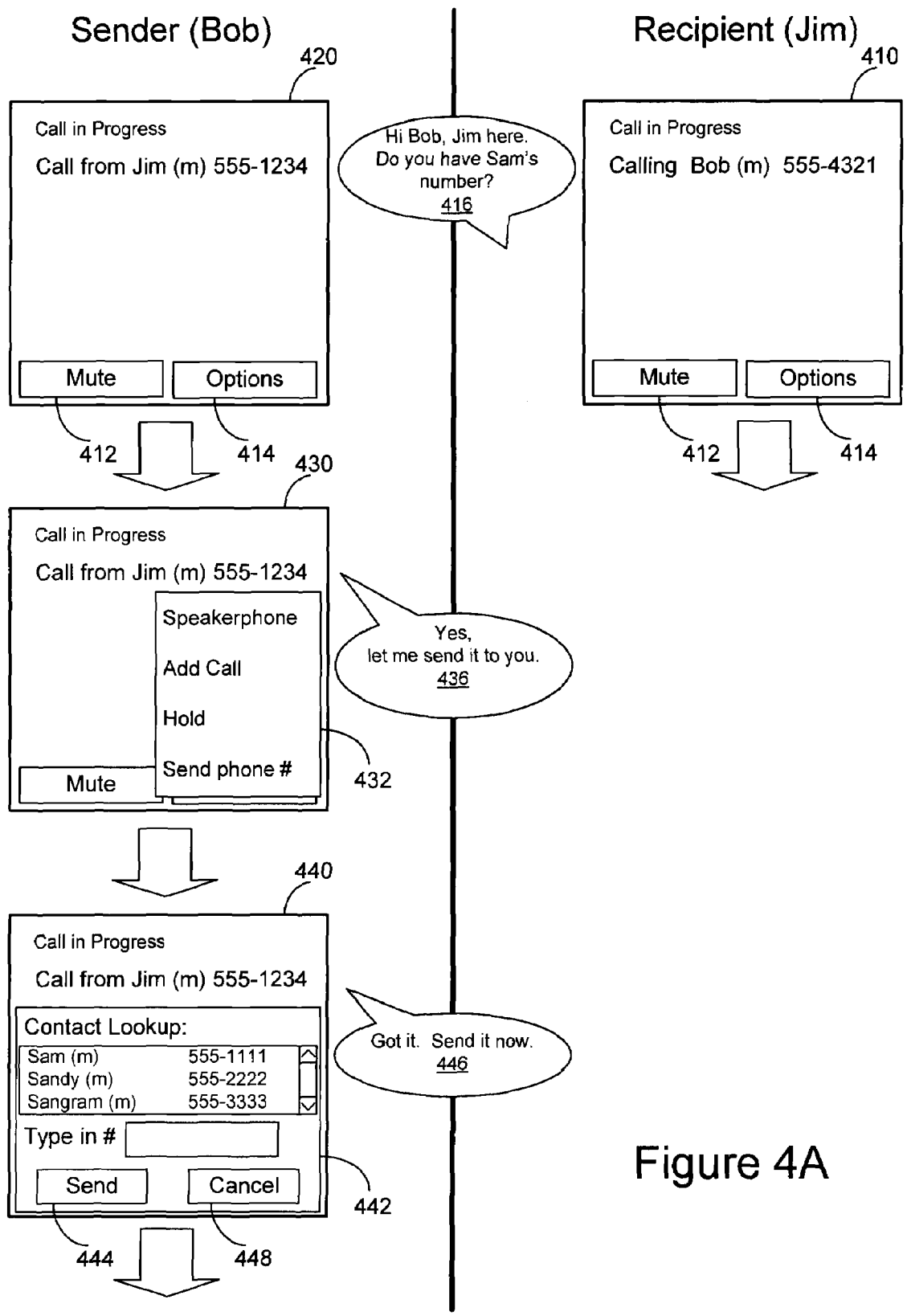
FIGS. 4A through 4C illustrate screenshots of embodiments of a transaction of sharing contact information between two mobile computing devices.
Figure 4B:
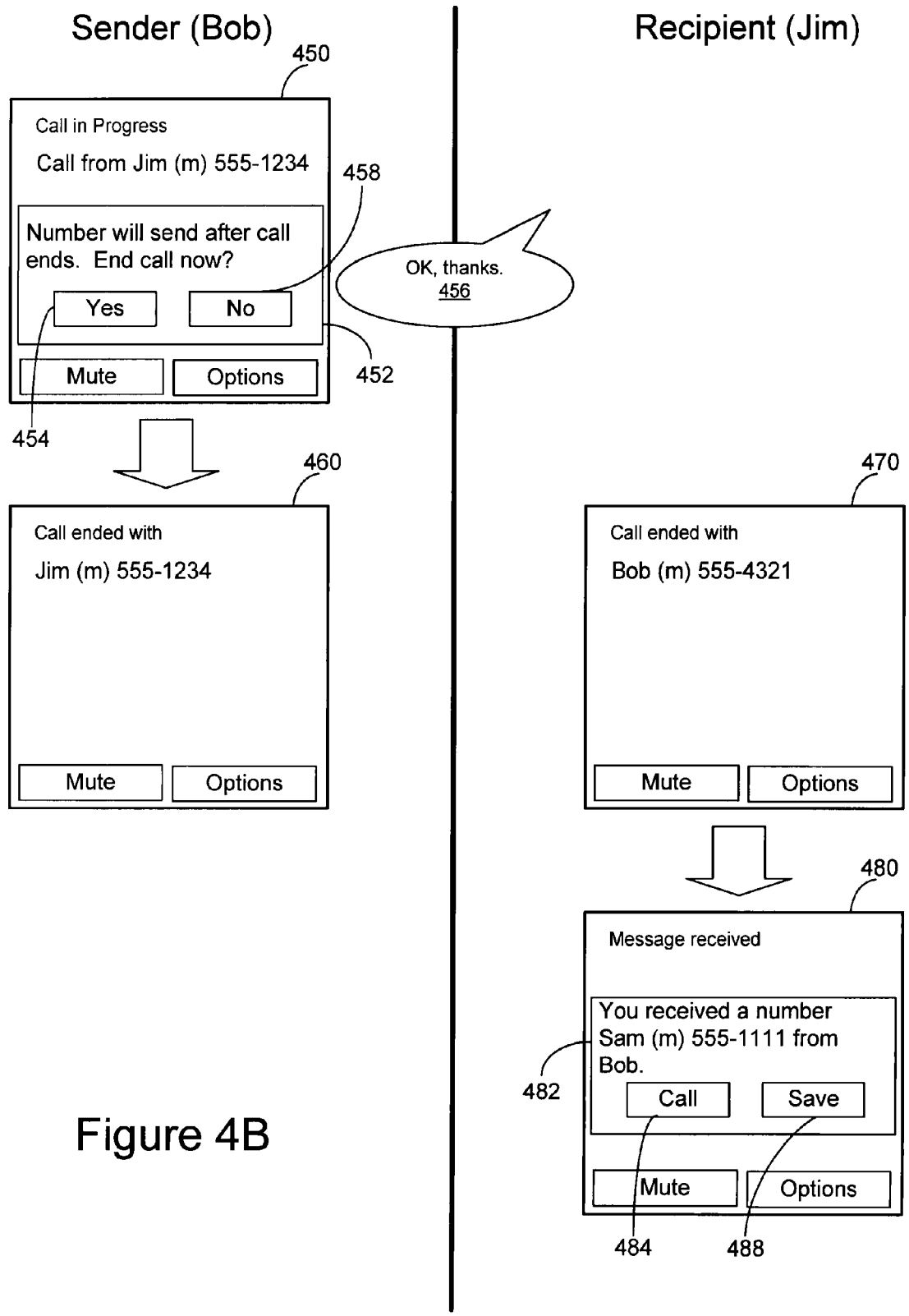

FIGS. 4A and 4B illustrate an example process through the principles disclosed herein. In this example, Jim the recipient calls Bob the sender for Sam's phone number. FIGS. 4A and 4B illustrates a series of screenshots of Jim's and Bob's mobile phones as the example process progresses, according to one embodiment disclosed herein. Screenshots for Jim's mobile phone are illustrated on the right hand side. Screenshots for Bob's mobile phone are illustrated on the left hand side. Conversations between Bob and Jim during the example process are illustrated in the center bubbles. Screenshots are ordered chronologically, with those recorded earlier placed on top. Screenshots in FIG. 4A are recorded earlier than those in FIG. 4B.

Jim the recipient initiates the process by calling Bob's mobile phone. Screenshots 410 and 420 illustrate the displays on Jim's and Bob's mobile phones after the phone call is connected, accordingly. As shown in FIG. 4A, the screenshots 410 and 420 display the status of the phone call ("Call in Progress") and identify the other party of the call. The screenshots 410 and 420 include a "mute" button 412 and an "option" button 414. The "mute" button 412 is designed to prohibit voice from being transmitted from a caller (Jim or Bob) who triggers the "mute" button 412. The "option" button 414 is designed to facilitate a caller (Jim or Bob) to perform activities while the phone call is alive. The caller can trigger (or activate) the buttons 412 and 414 via a touch-sensitive display or a hardware button on a keypad of the caller's mobile phone.

After establishing the phone call, Jim asks 416 Bob for Sam's number. As illustrated in FIG. 4A, Jim asked "Hi Bob, Jim here. Do you have Sam's number?" Bob responds 436 positively by answering "Yes, let me send it to you."

To send Sam's telephone number while maintaining the phone call, Bob triggers the "option" button 414 on his mobile phone. As illustrated in screenshot 430, Bob's mobile phone displays an option menu 432 containing a list of options (or activities). The list of options includes (1) speakerphone, (2) add call, (3) hold, and (4) send phone number. If Bob triggers the speakerphone option, the phone conversation will be outputted through a loudspeaker, such that Bob may engage in the conversation without picking up his mobile phone. If Bob triggers the add call option, Bob may invite other people to join the phone call and initiate a multi-party phone conference. If Bob triggers the hold option, the phone call will be temporarily on hold, and Bob can subsequently resume the phone call without dropping the call. If Bob triggers the send phone number option, Bob can send a phone number and optionally the associated contact information (e.g., name of the person associated with the phone number, the person's other contact information, etc.) to the other party of the phone call, Jim.

Bob triggers the send phone number option in the option menu 432. As illustrated in screenshot 440, responsive to the trigger, Bob's mobile phone pops up a dialog box 442 enabling Bob to look up locally stored contacts. The dialog box 442 also enables Bob to type in the phone number to be transmitted to Jim. The dialog box 442 also contains a "send" button 444 and a "cancel" button 448. The "send" button 444 is designed to send selected (or inputted) contact information to the other party of the phone call. The "cancel" button 448 is designed to cancel the send phone number activity and return the sender's mobile phone to a normal phone call state such as the one illustrated in the screenshot 420. As illustrated in FIG. 4A, Bob confirms 446 that he has found Sam's number and will send it over to Jim by stating "Got it. Sending it now."

Bob triggers the "send" button 444 displayed on his mobile phone. As illustrated in screenshot 450 in FIG. 4B, responsive to the trigger, Bob's mobile phone pops up a window 452 stating that the phone number will send after call ends and prompting Bob to end the phone call. The window 452 contains a "yes" button 454 and a "no" button 458. If Bob selects the "yes" button 454, his mobile phone will terminate the phone call immediately and transmit Sam's phone number to Jim's mobile phone via means such as a SMS message as set forth above with reference to FIG. 3. If Bob selects the "no" button 458, his mobile phone will return to a normal phone call state such as the one illustrated in the screenshot 420 and queue Sam's phone number for subsequent transmission (e.g., once the phone call is terminated). As illustrated in FIG. 4B, Jim acknowledges 456 that he will expect Sam's phone number by answering "OK, thanks."

Once Bob triggers the "yes" button 454, Bob's mobile phone terminates the phone call with Jim. Screenshots 460 and 470 illustrate the displays of Jim's and Bob's mobile phones after the phone call terminates, accordingly.

After terminating the phone call, Bob's mobile phone transmits Sam's phone number to Jim's mobile phone via a SMS message. Jim's mobile phone subsequently receives the SMS message, recognizes that it contains contact information, and extracts Sam's contact information contained in the SMS message. As illustrated in screenshot 480, Jim's mobile phone pops up a window 482 notifying Jim that he has received Sam's contact number from Bob. The window 482 also contains a "call" button 484 and a "save" button 488. The "call" button 484 is designed to initiate a phone call by dialing the phone number just received. The "save" button 488 is designed to store the received phone number in the mobile phone. Therefore, Jim may dial or store Sam's contact number with just one button press.

Figure 4C:
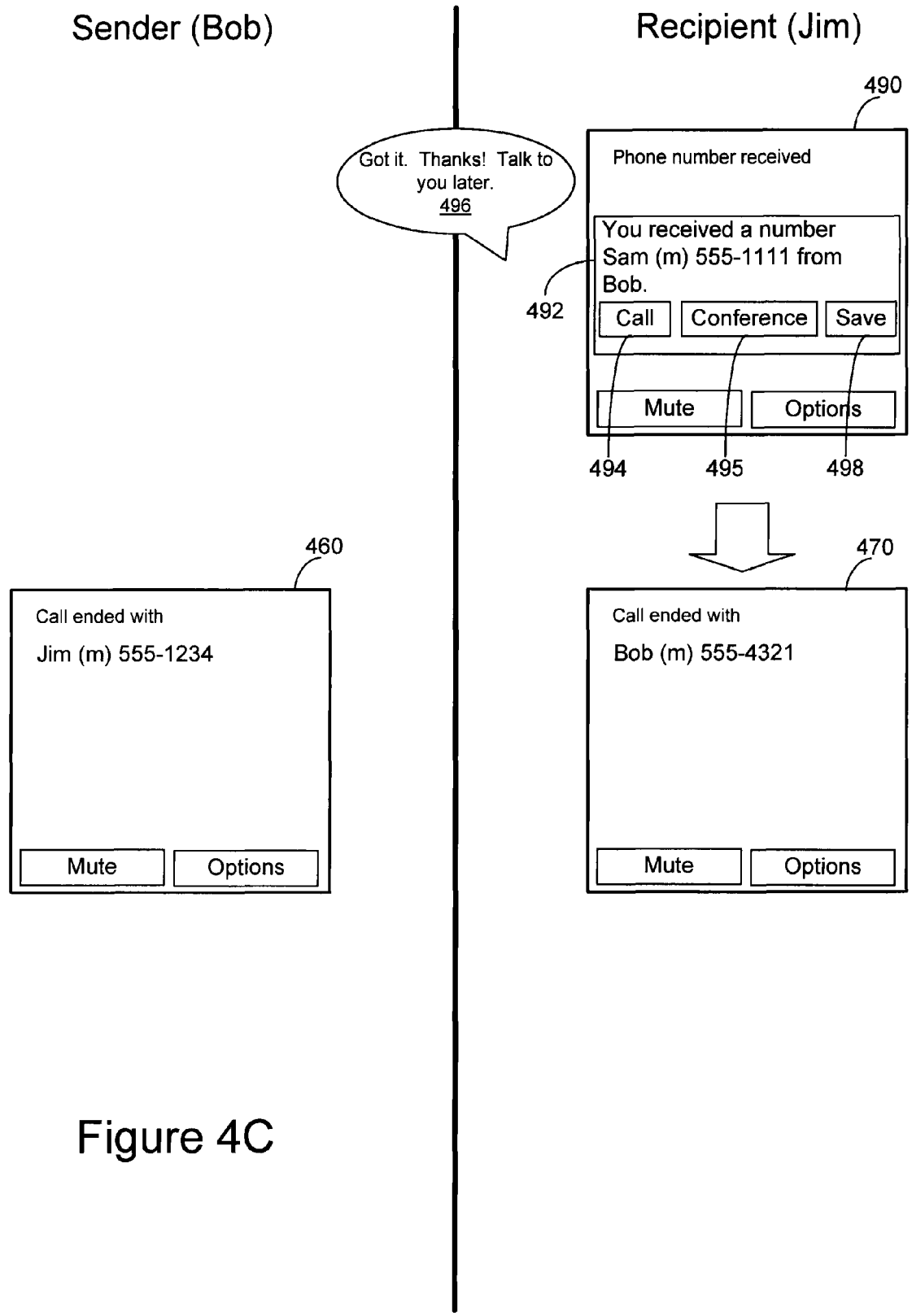

As described above with respect to FIG. 3, Bob the sender may transmit Sam's phone number while maintaining the phone call with Jim the recipient. FIGS. 4A and 4C illustrate this scenario. Similar to FIG. 4B, FIG. 4C illustrates a series of screenshots of Jim's and Bob's mobile phones recorded subsequent to the series of screenshots illustrated in FIG. 4A, according to one embodiment disclosed herein.

As described above with respect to FIG. 4A, Bob triggers the "send" button 444 displayed on his mobile phone. Bob's mobile phone maintains the phone call and transmits Sam's phone number through a voice channel of the phone call.

Jim's mobile phone receives Sam's phone number through the voice channel of the phone call. As illustrated in screenshot 490 in FIG. 4C, Jim's mobile phone pops up a window 492 notifying Jim that he has received Sam's phone number from Bob. The window 492 contains a "call" button 494, a "conference" button 495, and a "save" button 498. The "call" button 494 is designed to initiate a phone call by dialing the phone number just received. When Jim selects the "call" button 494, his mobile phone may (1) terminate the current phone call with Bob, (2) put the current phone call on hold, or prompting Jim to select between (1) and (2). The "conference" button 495 is designed to initiate a phone conference among Bob, Jim, and Sam. The "save" button 498 is designed to store the received phone number in the mobile phone. Therefore, Jim may dial or store Sam's contact number with just one button press. Jim confirms 496 that he has received Sam's number and will terminate the current phone call by stating "Got it. Thanks! Talk to you later."

Jim or Bob terminates the phone call. Screenshots 460 and 470 illustrate the displays of Jim's and Bob's mobile phones after the phone call terminates, accordingly.

Hence, the disclosed processes allow mobile phone users to conveniently share locally stored contact information. Also, the mobile phone users may dial and/or store a received phone number with just one button press.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for a single-axis window manager for use with a mobile communication device, or other devices having a limited display area through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method for operating a computing device, the method comprising:
    establishing a first phone call with a first mobile device by using a voice channel between the computing device and the first mobile device;
    receiving, over the voice channel from the first mobile device, information pertaining to a phone number associated with a second device while the first phone call is ongoing;
    in response to receiving information pertaining to the phone number, presenting a first selectable feature on a display of the computing device that, when selected by a user, causes the computing device to (i) terminate the first phone call with the first mobile device, and (ii) use the phone number to establish a second phone call with the second device; and
    concurrently presenting, with the first selectable feature, a second selectable feature on the display that, when selected by the user, causes the computing device to store the phone number in a memory of the computing device.

2. The method of claim 1, wherein receiving further comprises:
    receiving an audio signal via the voice channel; and
    converting the audio signal to the phone number.

3. The method of claim 2, wherein the received audio signal includes Dual Tone Multiple Frequencies tones.

4. The method of claim 1, further comprising:
    receiving a user selection of the second selectable feature; and
    in response to receiving the user selection, storing the phone number in the memory of the computing device while the first phone call is ongoing.

5. The method of claim 1, further comprising:
    receiving a user selection of the first selectable feature; and
    in response to receiving the user selection, (i) terminating the first phone call with the first mobile device, and (ii) establishing the second phone call using the phone number.

6. The method of claim 1, further comprising:
concurrently presenting, with the first selectable feature and the second selectable feature, a third selectable feature on the display that, when selected by the user, causes the computing device to initiate a conference call using the phone number while the first phone call is ongoing.

7. A non-transitory computer readable medium with stored instructions for operating a computing device, the instructions that, when executed by a processor of the computing device, cause the processor to perform operations comprising:
establishing a first phone call with a first mobile device by using a voice channel between the computing device and the first mobile device;
receiving, over the voice channel from the first mobile device, information pertaining to a phone number associated with a second device while the first phone call is ongoing;
in response to receiving information pertaining to the phone number, presenting a first selectable feature on a display of the computing device that, when selected by a user, causes the computing device to (i) terminate the first phone call with the first mobile device, and (ii) use the phone number to establish a second phone call with the second device using the phone number; and
concurrently presenting, with the first selectable feature, a second selectable feature on the display that, when selected by the user, causes the computing device to store the phone number in a memory of the computing device.

8. The non-transitory computer readable medium of claim 7, wherein the instructions cause the processor to further perform operations comprising:
receiving a user selection of the first selectable feature; and
in response to receiving the user selection, (i) terminating the first phone call with the first mobile device, and (ii) establishing the second phone call using the phone number.

9. The non-transitory computer readable medium of claim 7, wherein the instructions cause the processor to receive information pertaining to the phone number by:
receiving an audio signal via the voice channel; and
converting the audio signal to the phone number.

10. The non-transitory computer readable medium of claim 7, wherein the instructions cause the processor to further perform operations comprising:
receiving a user selection of the second selectable feature; and
in response to receiving the user selection, storing the phone number in the memory of the computing device while the first phone call is ongoing.

11. The non-transitory computer readable medium of claim 7, wherein the instructions cause the processor to further perform operations comprising:
concurrently presenting, with the first selectable feature and the second selectable feature, a third selectable feature on the display of the computing device that, when selected by the user, causes the computing device to initiate a conference call using the phone number while the first phone call is ongoing.

12. A computing device comprising:
a display device;
a memory resource; and
a processor coupled to the display device and the memory resource, the processor to:
establish a first phone call with a first mobile device by using a voice channel between the computing device and the first mobile device;
receive, over the voice channel from the first mobile device, information pertaining to a phone number associated with a second device while the first phone call is ongoing;
in response to receiving information pertaining to the phone number, present a first selectable feature on a display of the computing device that, when selected by a user, causes the computing device to (i) terminate the first phone call with the first mobile device, and (ii) use the phone number to establish a second phone call with the second device; and
concurrently present, with the first selectable feature, a second selectable feature on the display that, when selected by the user, causes the computing device to store the phone number in a memory of the computing device.

13. The computing device of claim 12, wherein the processor receives the information pertaining to the phone number by:
receiving an audio signal via the voice channel; and
converting the audio signal to the phone number.

14. The computing device of claim 13, wherein the received audio signal includes Dual Tone Multiple Frequencies tones.

15. The computing device of claim 12, wherein the processor:
receives a user selection of the first selectable feature; and
in response to receiving the user selection, (i) terminates the first phone call with the first mobile device, and (ii) establishes the second phone call using the phone number.

16. The computing device of claim 12, wherein the processor:
receives a user selection of the second selectable feature; and
in response to receiving the user selection, stores the phone number in the memory resource while the first phone call is ongoing.

17. The computing device of claim 12, wherein the processor concurrently presents, with the first selectable feature and the second selectable feature, a third selectable feature on the display of the computing device that, when selected by the user, causes the computing device to initiate a conference call using the phone number while the first phone call is ongoing.

* * * * *